(12) United States Patent
Tong et al.

(10) Patent No.: US 8,854,415 B2
(45) Date of Patent: Oct. 7, 2014

(54) MOTION RESPONSIVE VIDEO CAPTURE DURING A VIDEO CONFERENCE

(75) Inventors: Aaron Tong, San Jose, CA (US); Sung Fong Solomon Wu, Sunnyvale, CA (US); Martin Rudolf Eppel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 236 days.

(21) Appl. No.: 13/438,016

(22) Filed: Apr. 3, 2012

(65) Prior Publication Data

US 2013/0258036 A1    Oct. 3, 2013

(51) Int. Cl.
    *H04N 7/14*         (2006.01)
(52) U.S. Cl.
    USPC ................................... 348/14.07; 348/14.15
(58) Field of Classification Search
    USPC .......... 348/14.01, 14.02, 14.03, 14.07, 14.08, 348/14.1, 14.15
    See application file for complete search history.

(56) References Cited

U.S. PATENT DOCUMENTS

| 8,095,595 | B2 | 1/2012 | Bobbitt et al. |
| 2009/0222742 | A1 | 9/2009 | Pelton et al. |
| 2009/0251457 | A1 | 10/2009 | Walker et al. |
| 2012/0262537 | A1* | 10/2012 | Baker et al. ................ 348/14.08 |

FOREIGN PATENT DOCUMENTS

| WO | 0017848 A1 | 3/2000 |
| WO | 2005041018 A1 | 5/2005 |

OTHER PUBLICATIONS

International Search Report and Written Opinion in counterpart International Application No. PCT/US2013/034256, mailed Jun. 6, 2013.
Chen, Milton, "Achieving Effective Floor Control with a Low-Bandwidth Gesture-Sensitive Videoconferencing System," Proceedings of the tenth ACM international conference on Multimedia, Dec. 2002.

* cited by examiner

*Primary Examiner* — Olisa Anwah
(74) *Attorney, Agent, or Firm* — Edell, Shapiro & Finnan, LLC

(57) ABSTRACT

A mobile communication device that is outfitted with motion detection mechanisms is used to construct a viewport on audio-visual data. As the communication device is moved along a spatial trajectory, the viewport is positioned accordingly. A virtual space can be constructed such that the spatial trajectory is mapped into the virtual space and the user can navigate the virtual space by suitable movement of the communication device. Accordingly, a user can use natural body movements to navigate the virtual space through the viewport.

20 Claims, 7 Drawing Sheets

MOTION RESPONSIVE VIDEO CAPTURE DURING A VIDEO CONFERENCE

TECHNICAL FIELD

The present disclosure relates to image and video processing and selection of portions of image and video data by a motion responsive selection device.

BACKGROUND

Mobile devices are increasingly being used to provide users access to dynamic content, such as streaming video and the like. Indeed, much of what can be done on a conventional personal computer terminal can now be done on a mobile device. However, the size limits of a mobile device can set bounds on its usefulness. For example, while web browsing and video streaming are available for mobile devices, the display size often renders the image to a size that makes clear viewing difficult. While many mechanisms for zooming are known, scrolling the image to view different sections is often inconvenient. Moreover, using a mobile device to participate in a video conference has its limitations.

DESCRIPTION OF EXAMPLE EMBODIMENTS

Overview

Audio-visual (AV) frames, i.e., video frames, are generated for presentation. A viewport is established to span a portion of each of the AV frames. Motion of a user device along a spatial trajectory is detected and the portion spanned by the viewport in consecutive AV frames is updated so as to correspond with the spatial trajectory. The updated viewport of the consecutive AV frames is displayed on the user device.

Example Embodiments

Figure 1A:
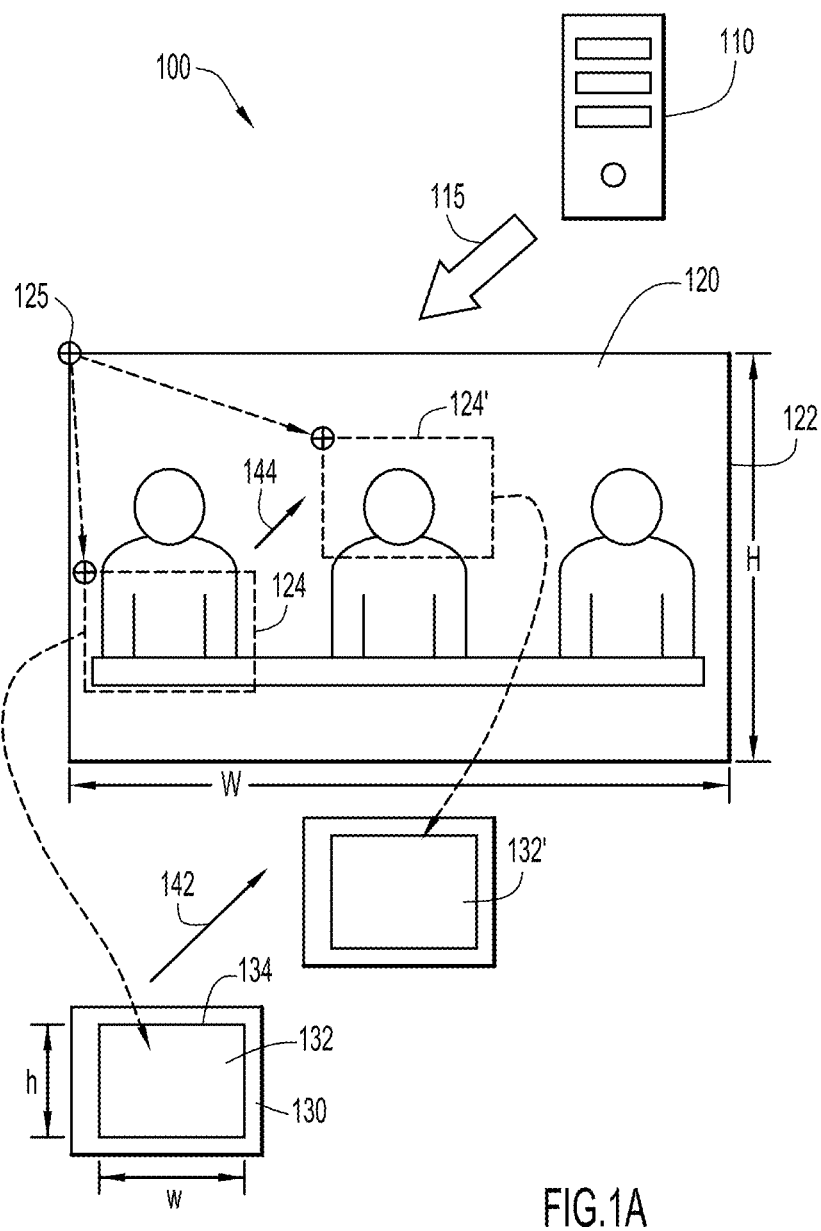
FIGS. 1A and 1B are conceptual diagrams illustrating aspects of motion responsive video capture techniques described herein.

An example of motion capture data selection is generally illustrated in FIG. 1A. As used herein, motion capture data access (MCDA) refers to accessing or selecting data by way of a motion sensitive selection device. It is to be understood that the term, "motion capture data access," while descriptive, is not intended to convey limitations to its embodiment, implementation or application. Indeed, such data access will have application in fields of endeavor other than those described herein.

In FIG. 1A, MCDA system 100 includes a data source, such as a server 110, to provide a data set, such as an audio-visual (AV) (i.e., video) stream 115. Although AV data is used herein as an example, it is to be understood that other data formats can be used with MCDA, as the ordinarily skilled artisan will recognize and appreciate. AV stream 115 may include data by which a dynamic scene 120 may be rendered and presented on a display device. As used herein, a dynamic scene is a representation of objects that changes over time. Such dynamic scene 120 may include dynamic audio and, as such, AV stream 115 may include audio signals by which sound is generation when provided to a suitable transducer, such as a loudspeaker. The audio and video data in AV stream 115 may be encoded and/or compressed and may require decoding and/or decompression to be rendered in a manner that is perceivable by and/or meaningful to a user. For purposes of description and not limitation, the data of AV stream 115, referred to herein as AV data, will be described as if the audio signals and images are in the fully rendered form, referred to herein as AV frames, with the understanding that additional measures, such as decompression and/or decoding may be required to achieve such rendering. Additionally, in the following disclosure, MCDA will be described in terms of images and image processing, such as in the context of a video conference, but it is to be understood that audio data and audio processing may be included in the techniques described herein.

AV stream 115 may include a sequence of AV frames that are presented at a predetermined playback rate to produce dynamic scene 120. As illustrated in FIG. 1A, dynamic scene 120 is bounded at boundaries 122 corresponding to the boundaries of the underlying AV frames. Such boundaries 122 may be artifacts of the optical aperture of an image capture device by which AV stream 115 was created, may be a result of one or more image processing operations such as cropping and/or a result of other size limiting processes. Regardless of the process by which boundary 122 is formed, it establishes the dimensions of dynamic scene 120, representatively illustrated by width W and height H. It is to be understood that the dimensions W and H of dynamic scene 120 may be in arbitrary units. It is to be understood further that while dynamic scene 120 is illustrated as rectangular in shape, MCDA is not so limited, as will be recognized and appreciated by the ordinarily skilled artisan upon review of this disclosure.

MCDA system 100 may include a motion sensitive access device, or simply access device, representatively illustrated by mobile device 130. Mobile device 130 may be implemented in a cellular phone, a smart phone, a mobile computer including tablet computers, a personal entertainment device, and other such devices that can receive AV stream 115 and render the data contained therein. Additionally, to serve as a motion sensitive access device, mobile device 130 includes a motion detection apparatus to generate a set of parameters by which portions of data from dynamic scene 120 may be specified, as will be described in detail below.

As illustrated in FIG. 1A, boundary 134 defines the dimensions of display region 132, representatively illustrated by width w and height h. Display region 132 may have a fixed number of pixels that define a fixed resolution thereof. This fixed resolution may limit the quantity and/or quality of image data that can be displayed. In certain traditional mobile devices, zooming in and out of a region of interest may be implemented to overcome these limitations, but such may require image shifting by way of one or more scrolling controls. Any user having even limited experience in such control will recognize its inconvenience and tedium.

In accordance with MCDA as embodied by system 100, a user may move the mobile device 130 to locate a region of interest in scene 120 for display on display 130. For example, as illustrated in FIG. 1A, a first region 124 of scene 120, referred to herein as a viewport 124, may be displayed in display region 134. That is, dynamic scene 120 may be mapped into display region 132. The dimensions of dynamic scene 120 may be beyond that of the visualization area of display region 132 and, as such, the entire dynamic scene 120 may not be displayed at full resolution thereon. Viewport 124 thus selects a portion of dynamic scent 120 so that regions thereof 120 can be displayed at higher relative resolution.

As mobile device 130 moves along a trajectory 142, such as by body motion of the user, the display region 132 is updated, as illustrated at display region 132', with the image data in viewport 124'. In certain embodiments, the trajectory 142 of mobile device 130 is mapped as trajectory 144 of viewport 124, 124'. When so embodied, the viewport 124 may be positioned by way of natural body movements in an intuitive manner. That is, when a viewer wants to view a different portion of image 120, the user moves the mobile device 130 in the corresponding direction until the image region of interest is encompassed by the viewport. Data processing techniques, such as those described below, may be employed to position viewport 124 relative to a fixed or known point 125 of frames comprising dynamic scene 120 based on the trajectory 142 and, correspondingly, trajectory 144.

Figure 1B:
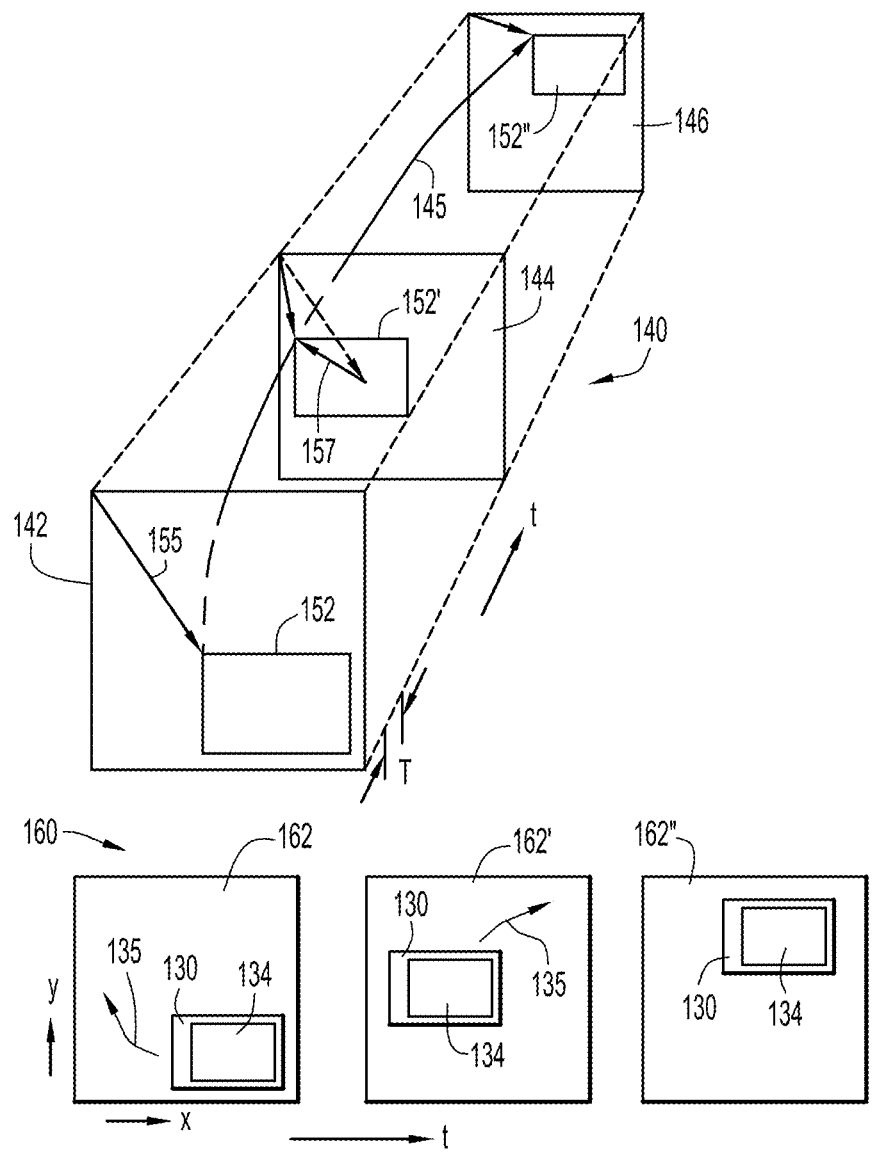

In FIG. 1B, a sequence of video frames 140, such as might form an AV stream, includes a plurality of temporally-ordered video frames, representatively illustrated at video frames 142, 144 and 146. As the video frames are presented to a user at a predetermined playback rate, representatively illustrated by playback period T, the sequence is perceived by a human user as a temporally dynamic scene, representatively illustrated collectively as dynamic scene 160 and as a sequence of scene states 162, 162' and 162". Scene states 162, 162' and 162" represent a few samples of the dynamic scene 160 that do not necessarily correspond to particular frames in the video frame sequence 140. MCDA allows a user to move a viewport, representatively illustrated at viewport 152, 152', 152", through a trajectory 135 in space and the user's perception and intuition to relationships in the real world as represented in dynamic scene 160 assist the user in selecting that trajectory. For example, in FIG. 1A, viewport 124 encompasses an upper torso of a human at a left side of the scene. The user's natural intuition as to the relationship between a human torso and a human head guides the user to move the viewport in the corresponding direction, such as is illustrated at viewport 124'.

Returning to FIG. 1B, as mobile device 130 is moved along trajectory 135, MCDA maps viewport 152 along a trajectory 145 through the sequence of AV frames 140 corresponding to the spatial trajectory 135. That is, an offset 155 for the viewport 152 is mapped onto consecutive video frames 142, 144 and 146, as illustrated by the relative positions of viewport 152, 152' and 152" with respect to AV frames 142, 144 and 146. In certain embodiments, the offset 155 may be established in accordance with a differential location of the viewport in a previous with respect to a current frame, as illustrated by differential offset vector 157.

Figure 2:
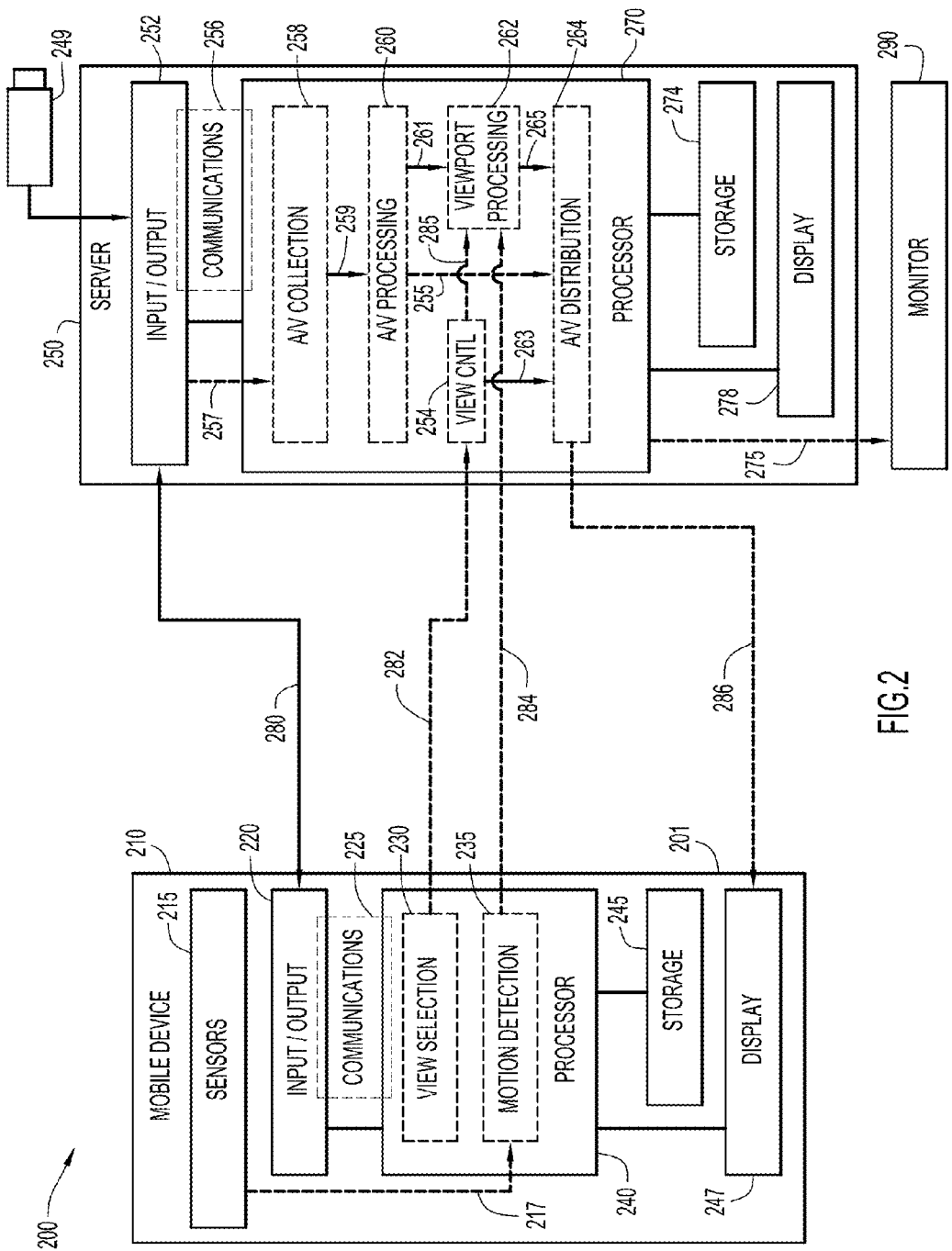
FIG. 2 is a schematic block diagram of system component by which motion responsive video capture techniques may be embodied.

In FIG. 2, an MCDA system 200 is illustrated, by which the functionality generally described with reference to FIGS. 1A-1B may be implemented. MCDA 200 may include a mobile device 210 and a server 250 communicatively coupled by a communication channel 280. MCDA is not limited to the data format, transport mechanism or media of communication channel 280. For purposes of description and not limitation, it will be assumed that communication channel 280 is a wireless communication channel compatible with a cellular telephone network over which Internet Protocol (IP) packets may be transported by a suitable transport protocol such as, for example, Transfer Control Protocol (TCP) and/or User Datagram Protocol (UDP). When so embodied, mobile device 210 may be, for example, a smartphone and server 250 may be a computer system coupled to the Internet. It is to be understood that while communication channel 280 is illustrated in FIG. 2 as a direct connection between mobile device 210 and server 250, such is solely for simplification of the illustration. The ordinarily skilled artisan will recognize that communication channel 280 may established through numerous intermediary devices, such as gateways, routers and switches.

Mobile device 210 may include one or more spatially-sensitive sensors 215, a processor 240, an input/output (IO) subsystem, a storage unit 245 and a display unit 247. As used herein, a spatially-sensitive sensor, or, for conciseness, simply a sensor, is a device that generates a signal indicative of its position or orientation in space, either absolutely, i.e., in terms of, for example, standardized geographic coordinates, or relatively, such as with respect to a previous position or orientation. Spatially-sensitive sensors may include, but not be limited to accelerometers, magnetometers, compasses, gyroscopes and global positioning system (GPS) receivers. Other sensors that fit the definition for a spatially-sensitive sensor given above may be used as well, as will be recognized upon review of this disclosure.

Processor 240 may be implemented in suitable circuitry to execute various system, control and MCDA processes on mobile device 210. Numerous processor architectures may be used to embody MCDA including, but not limited to, field programmable circuits, application specific integrated circuits (ASICs), microprocessors, microcontrollers and digital signal processors. Additionally, processor 240 may comprise multiple processing circuits, including those in separate and distinct packaging and/or processing paradigms. For example, mobile device 210 may include a processing circuit for system processing and control and a separate processing circuit to manage, control and process communications data and transport information. Additionally, processor 240 may include, in either a separate package or integrated in a common package, a dedicated graphics processor for rendering visual data for display. MCDA can be embodied in these and other processing systems, as will be recognized and appreciated upon reviewing this disclosure.

IO subsystem 220 includes interface circuitry that facilitates signaling and data transfer and/or formatting between processor 240 and external devices, including those connected to a communications network such as the Internet. It is to be understood that IO subsystem 220 is illustrated in FIG. 2 as a single unit, such is solely for purposes illustration and concise description. IO subsystem 220 may include several distinct units including a network interface circuit (network adapter), computer IO port circuitry, such as Universal Serial Bus (USB) interface circuitry, device-specific interface circuitry, such as for special-purpose equipment, analog-to-digital circuits (ADCs), digital-to-analog circuits (DACs), data translation circuits, signal level shifting circuits, amplifiers, to name a few. The ordinarily skilled artisan will be able to infer from this disclosure appropriate circuitry for inclusion in IO subsystem 220 to carry out an embodiment of MCDA per the requirements of a particular application.

Storage unit 245 includes suitable circuitry, such as digital memory circuitry, to provide data and, optionally, processor instruction storage for processor 240. Such storage may include volatile storage that is purged upon removal of power therefrom and/or persistent storage which retains its contents even if power is removed. An example of volatile memory is random access memory (RAM) and examples of persistent storage include read-only memory (ROM), magnetic or optical memory, and flash memory. Storage unit 245 may include multiple components of different storage mechanisms as required for the application in which MCDA is embodied.

Mobile device 210 may include a display device 247 to display, among other things, various data and user controls. Display device 247 may comprise an array of elements, such as light-emitting diodes, plasma cells, liquid crystal cells, etc., by which image pixels are formed. The elements are operable to convert a pixel value provided thereto by processor 240 into a visually perceptible representation thereof. Display device 247 may also be touch-sensitive, such as by resistive, capacitive, optical and ultrasonic mechanisms. When so embodied, a graphical user control, such as is implemented in a graphical user interface (GUI), may be activated by touching a corresponding region on display device 247. Embodying MCDA does not rely on a specific implementation for display device 247; numerous display technologies may be deployed per the requirements of the application in which MCDA is embodied.

Sensors 215, IO subsystem 220, processor 240, storage unit 245 and display 247 may be commonly housed in an enclosure 201. Sensors 215 may be mechanically coupled to enclosure 201 such that motion of enclosure 201 is imparted to the sensors 215. When so embodied, the enclosure 215 may be moved along a trajectory through natural body movements and the viewport image in display 247 tracks the body movements in an intuitive way, as will be further explained below.

As illustrated in FIG. 2, server 250 includes an IO subsystem 252, a processor 270, a storage unit 274 and a display 278. These components serve similar purposes as the like-named components of mobile device 210 and may be similarly implemented. As such, specific description of IO subsystem 252, processor 270, storage unit 274 and display 278 will be omitted solely to limit repetition. Functional differences between components of mobile device 210 and server 250 will be apparent from the descriptions that follow. However, it should be appreciated that while mobile device 210 performs operations on behalf of a single user, server 250 may perform services for numerous users. As such, the processing capabilities of server 250 may be scaled appropriately to the computational load of such services.

MCDA may be performed through processes executed through computational resources on mobile device 210 and server 250, as illustrated by the dashed line blocks and lines in the figure, each of which will be described in paragraphs that follow. However, certain computational resources on each of mobile device 210 and server 250 may be devoted to other processes, such as an operating system or system control process that are not illustrated in FIG. 2 or described in detail herein. However, it is to be understood that certain functionality of MCDA in a particular application may rely on services provided by such other processes. This will be readily understood by the ordinarily skilled without implementation details of such being provided herein.

Mobile device 210 and server 250 both include communications processes 225 and 256, respectively. The functional objectives of these processes with regard to MCDA are substantially the same, i.e., the setup, tear-down and maintenance of communication channel 280, and the conveyance of data between mobile device 210 and server 250 over the communication channel 280. Thus, communication processes 225 and 256 both may perform similar operations such as, for example, data formatting, data packetization and encapsulation, addressing, flow control, channel coding/decoding, multiplexing and de-multiplexing, modulation and demodulation, signal transmission and receiving, among others. To achieve this functionality, communication processes 225 and 256 may involve circuitry across processors 240 and 270 and respective IO subsystems 220 and 256. While communication processes 225 and 256 have similar purposes, either may be configured to perform certain functions not required or implemented in the other. For example, mobile device 210 may be a wireless device and, as such, may include hardware and may execute associated processes to form communication channel 280 across a wireless media, such as air, and to transmit and receive data across the media through the communication channel 280. Server 250, on the other hand, may be connected to a network of conductors, such as by Ethernet compliant cables and, accordingly, will incorporate the hardware and execute associated processes to form communication channel 280 across electrical conductors. It is to be understood, however, that MCDA is not limited to particular hardware or communication process and communications channel 280 may be implemented in numerous different communications technologies. The mobile device 210, as described further hereinafter, may be an endpoint of a participant in a video conference and the aforementioned AV frames are video frames that contain one or more other participants in the video conference.

MCDA system 200 may include one or more data sources, representatively illustrated at camera 249, which, solely for purposes of description, will be the originating data source in the example embodiment, although MCDA may be used with data other than video data. It is to be understood that while camera 246 is illustrated as being directly connected to server 250 via IO subsystem 252, camera 246 may be communicatively coupled via a communication channel similar to communication channel 280. The signals from camera 249, representatively illustrated at signal line 257 and may include both video and audio signals, may be collected by IO subsystem 252 and provided to AV collection process 258. AV collection process 258 may construct streams of video and audio data from each camera 249 of MCDA system 200. AV collection process 258 may also perform certain image and audio processing on frames in the AV streams, such as to enhance AV quality.

Figure 3:
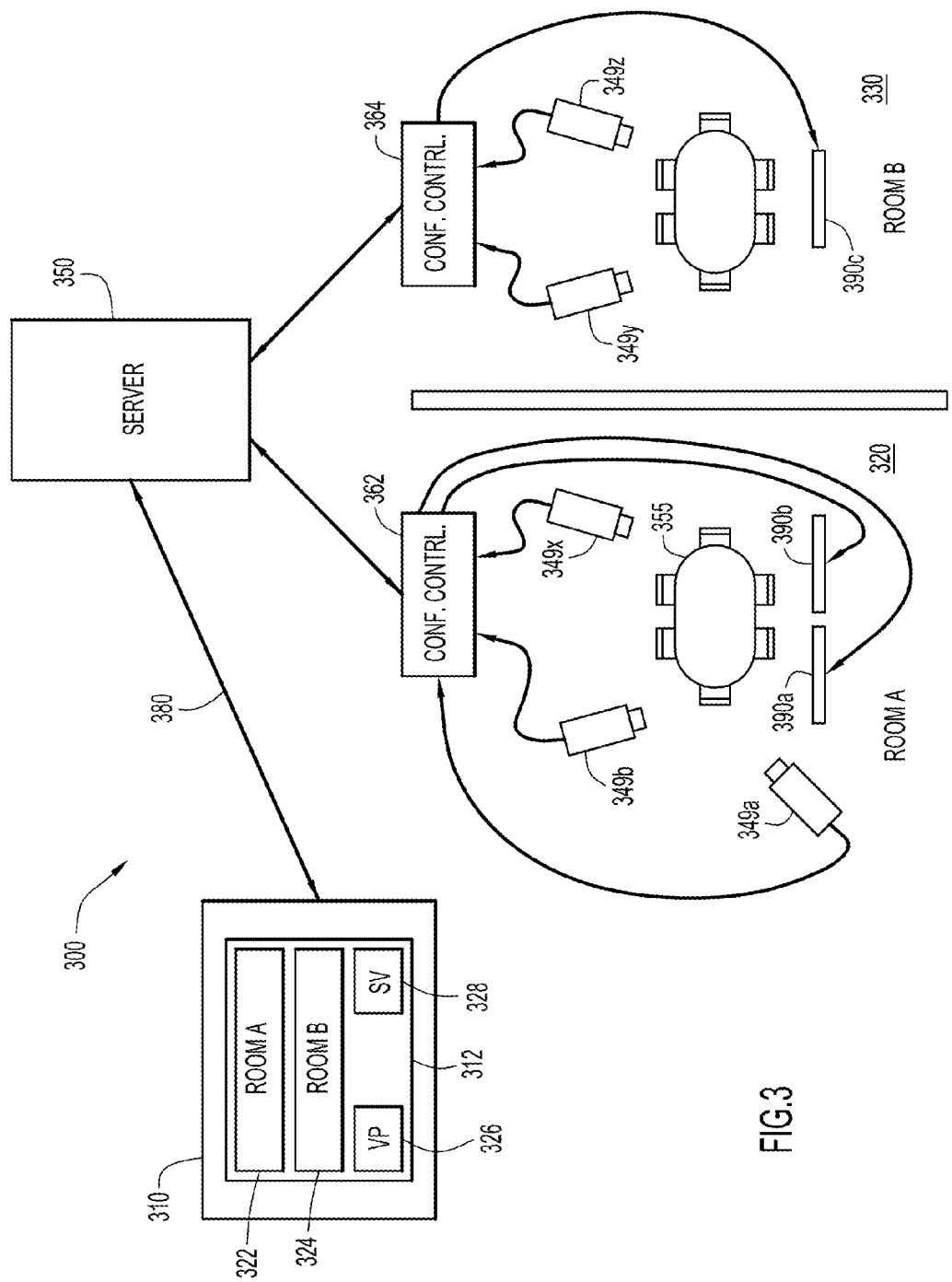
FIG. 3 is a diagram of a teleconference application of the motion responsive video capture techniques.

Video streams from AV collection process, representatively illustrated at stream line 259, are provided to AV processing process 260, which prepares the streams in a prescribed way which depends upon application. Once such application, a teleconferencing application, is illustrated in FIG. 3, by which participants at different geographic locations, representatively illustrated at locations 320 and 330, confer with each other. Teleconferencing system 300 includes a server 350, which may be implemented in a similar manner to server 250, and one or more mobile devices, representatively illustrated at mobile device 310, which may be implemented in a similar manner to mobile device 210. Server 350 may implement teleconferencing communication center and may be communicatively coupled to mobile device 310 via communication channel 380. Teleconference system 300 may include a plurality of cameras 349a-349x at location 320 and cameras 349y and 349z at location 330 (microphones may also be distributed in rooms 320 and 330). Additionally, location 320 may have positioned thereat monitors 390a and 390b and location 330 may have a monitor 390c. Cameras 349a-349z and monitors 378a-378c may be communicatively coupled to respective conference controllers 362, 364, which may be in communication with server 350. Conference controllers 362, 364 may provide central data aggregation/distribution between cameras 349a-349z/monitors 390a-390c and server 350, and may perform certain functions of server 250 in FIG. 2, such as operations associated with AV collection process 258 and AV distribution process 264, which are discussed in more detail below.

In one scenario, a common teleconference session may be carried out between participants at location 320, location 330 and the user of mobile device 310. Cameras 349a-349x and monitors 390a, 390b may be distributed throughout location 320 in a known manner and, similarly, cameras 349y, 349z and monitor 390c may be distributed throughout location 330. A number of conference participants may be seated in various positions around conference table 355 and different cameras 349a-349x may capture the different participants. In certain embodiments, cameras 349a-349x may capture the video streams of other participants being presented on monitors 390a and 390b. For example, AV data corresponding to conference participants at location 330 may be presented on, for example, monitor 390a. Camera 349b, for example, may capture the presentation on monitor 390a for further processing, as will be described in more detail below.

Figure 4:
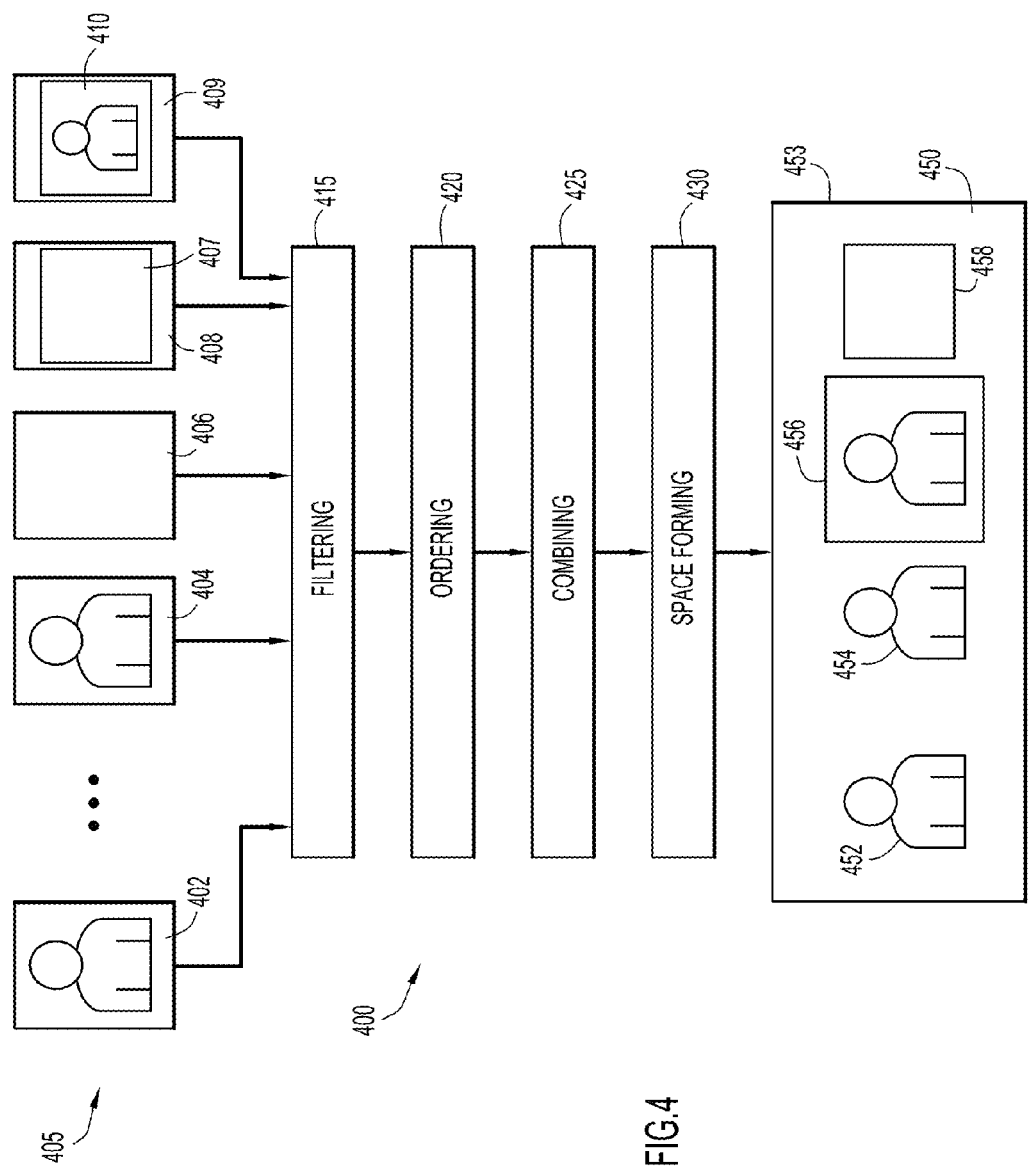
FIG. 4 is a diagram of audio-visual processing used in conjunction with embodiments of the motion responsive video capture techniques.

In FIG. 4, an example of an AV processing process 400 is illustrated, which may be implemented for an application such as that illustrated in FIG. 3. Process 400 receives one or more AV feeds from, for example, cameras 349a-349z at one or more locations 320, 330. For example, AV feeds 402-404 may centered on conference participants while AV feed 406 may be that of an empty seat. AV feed 408 may contain content of presentation materials, such as by way of a whiteboard, a slide show, other AV data, etc. AV feed 409 may be that of a remote participant on a monitor 410 being captured a camera in a local conference room. The AV feeds 402-409, collectively referred to as AV feeds 405, may be collected by AV collection process 258 and provided to AV processing process 260, of which process 400 is an example, to assemble the data for a dynamic scene 450.

AV feeds 405 may be provided to filtering process 415, by which the AV data therein are filtered. Such filtering may include image/audio filtering and enhancement, such as to remove noise and other unwanted image components, but may also include content filtering. Image/audio filtering may include, for example, cropping, rotation, color correction, pixel interpolation, zooming, etc.; MCDA is not limited to any set of such operations. Content filtering removes unwanted data from the AV feeds 405, e.g., redundant and/or superfluous data that may complicate navigation by an access device. For example, filtering process 415 may recognize that AV feed 406 is relatively static, i.e., contains little or no moving image data. Accordingly, filtering process 415 may exclude the data of AV feed 406 from further processing. Such non-informational data may be removed from other AV feeds 405 that do contain dynamic data, such as by cropping. Excluding non-informational data from dynamic scene 450 allows shorter trajectories for the access device to access relevant portions thereof.

Data from the filtered AV feeds may be provided to an ordering process 420 by which the content thereof is assigned a position in dynamic scene 450. Such ordering may be to provide an intuitive location of data from each feed. For example, as illustrated in dynamic scene 450, participants of the conference are placed together, i.e., participants 452-454 are placed adjacent one another and other participants, such as the remote participant 456, are placed adjacent to the others. Presentation data 458 may be located adjacent to the participants. Other ordering schemes are possible, essentially without limit. The ordered feeds may then be combined in combining process 425 for converting into a single AV stream. Such may be achieved by reassigning pixel positions of the ordered feeds to those of a single array from which the emerging AV stream is generated.

Figure 5:
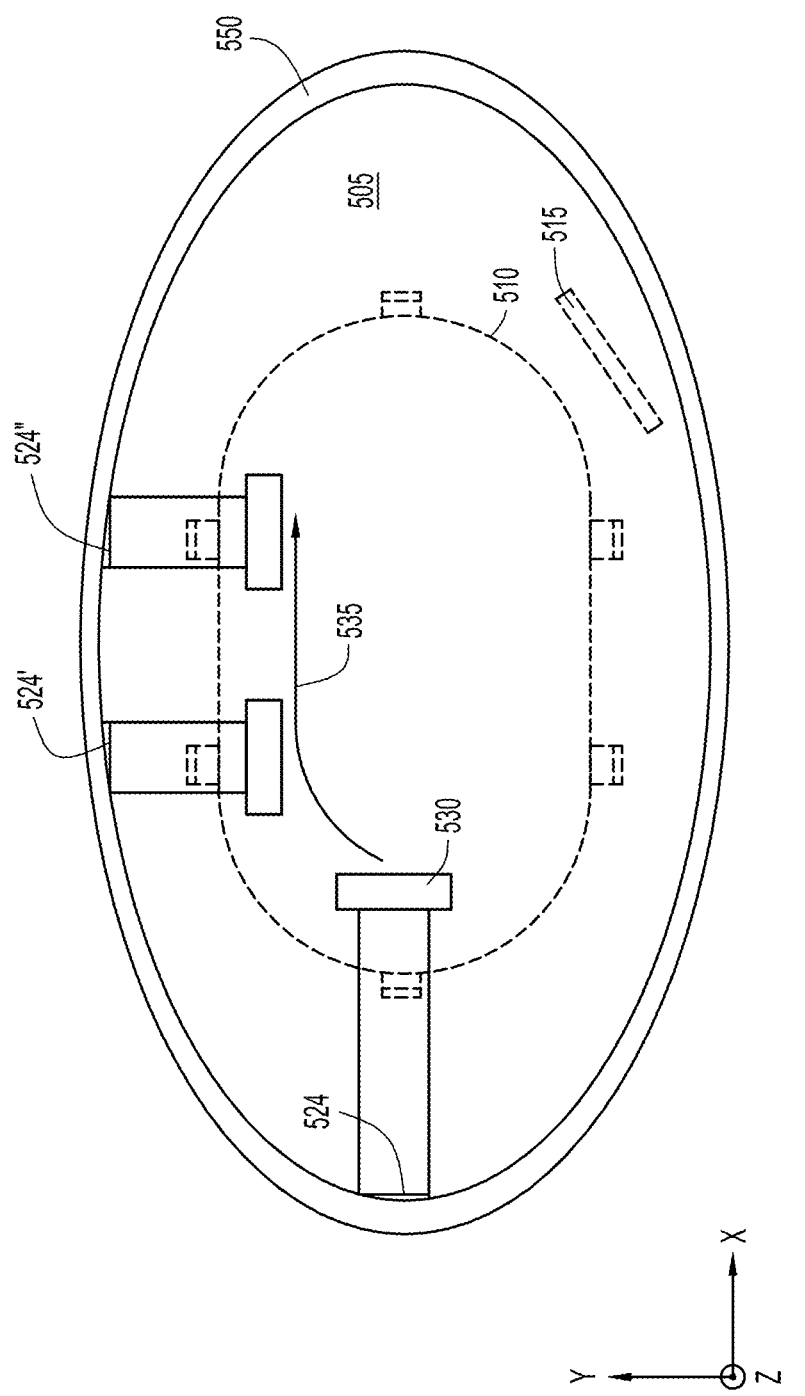
FIG. 5 is a conceptual diagram of a virtual space used in conjunction with embodiments of the motion responsive video capture techniques.

In certain embodiments, a virtual space may be formed from the dynamic scene 450 by space forming process 430. As used herein, a virtual space is a modeled environment through which data are accessed. A conceptual diagram of such is illustrated in FIG. 5. Dynamic scene 550 may be mapped such that elements represented therein are positioned in the virtual space 505 so as to require a particular trajectory 535 of selection device 530 to access the corresponding data. For example, as illustrated in FIG. 5, the AV data of dynamic scene 550 may be mapped to a virtual conference table 510 and the participants, such as those illustrated at 452-456 in FIG. 4, are mapped to seats corresponding to the order established by ordering process 420. Additionally, the presentation materials 458 may be mapped to a virtual presentation device 515. The user of selection device 530 may be mapped to an origin of virtual space 505, such as at the center of virtual conference table 510. When so configured, the selection device 530 may move along an elliptical trajectory 535 so that viewport 524 can be located at regions of interest in dynamic scene 550, as illustrated at viewports 524' and 524". It is to be understood that trajectory 535 need not be extensive, i.e., MCDA may be embodied so that simple rotations of a user's body, or portions thereof, are sufficient to locate viewport 524 at the appropriate location.

Space forming process 430 may apply a mapping function to the image region within boundaries 453 of dynamic scene 450 and the AV data thereof can be retrieved through the mapped region. MCDA is not limited to any particular mapping and such can vary per the requirements of the particular application in which it is embodied.

Returning once again to FIG. 2, the processed data output by AV processing process 260 are provided to AV distribution process 264 and are distributed in accordance with signal 263 from view control process 254, which is described below. AV distribution process 264 provides properly formatted AV data to display 247 of mobile device 210 and to other locations, such as monitor 290 as formatted AV data 275.

Processor 240 of mobile device 210 may execute a view selection process 230 by which data may be selected for presentation on display 247. For example, in one selection, the participants in one of teleconference locations 320 and 330 may be presented, and in another selection, the video streams of both locations 320 and 330 may be simultaneously presented in different regions of display 247. In yet another selection, the virtual space may be displayed on display 247. In certain embodiments, view selection process 230 utilizes services of a GUI executing on processor 240 and display 247. An example of such is illustrated on mobile device 310 of FIG. 3. Display 312 may have user controls disposed thereon in accordance with a GUI. For example, user control 322 may be used to select a dynamic scene of location 320 and user control 324 may be used to select a dynamic scene of location 330. In certain embodiments, a representation of the respective dynamic scenes may be presented in user controls 322 and 324 so that the user can monitor the activity at each location 320, 330. The user may then activate one of the controls 322, 324 to display a full representation of the dynamic scene of the corresponding location 320, 330. A user control 326 may be used to activate a viewport into a virtual space created for the associated dynamic scene and another control 328 may be used to return to a standard view, e.g., the full representation of the dynamic scene. Other controls may be implemented as well; the foregoing are merely examples.

View selection process 230 monitors the controls of mobile device 310 and provides an indication of the selection to server 250 through, for example, a suitably formatted application-layer message 282 conveyed over communication channel 280. A receiving process, view switch process 254 executing on processor 270, may receive message 282 and provide an indication of the selection to AV distribution process 264, which, in turn, provides the selected AV stream 286 to display 247 over communication channel 280.

As previously stated, view selection process 230 may implement an option for selecting a viewport view of a selected dynamic scene. An indication 285 of such selection may be provided to viewport processing process 262 by which a viewport into the virtual space is constructed. Viewport processing process 262 may have access to various viewport parameters, such as boundary dimensions and resolution thereof, which may be stored in storage unit 274. In certain embodiments, the viewport parameters correspond to the physical dimensions and resolution of display 247 on mobile device 210. Server 250 may have received such information in device capabilities messages received from mobile device 210 during a communication session setup procedure, although MCDA is not so limited.

Viewport processing process 262 may access dynamic scene data, representatively illustrated at data stream 261, from AV processing process 260 through the mapping applied in space forming process 430. Viewport processing process 262 may select a span of data from the dynamic scene corresponding to the size of the viewport and form a corresponding AV stream as described above. The location of the viewport may be established in accordance with motion parameters, representatively illustrated at motion parameter stream 284, provided by motion detection process 235. Motion detection process 235 receives signals 217 from sensors 215 and determines the trajectory of mobile device 210 therefrom. In certain embodiments, the motion parameters 284 are provided as a trajectory in the virtual space, and viewport processing process 262 accesses the region of the dynamic scene corresponding to the virtual space trajectory. Viewport processing process 262 may retrieve the AV data of the accessed region to form AV frames accordingly, as described above with reference to FIG. 1B. These AV frames are provided in an AV stream 286, through AV distribution process 264, to display 247. As mobile device 210 is moved, AV stream 286 is updated in accordance with the location of the viewport in the virtual space.

In certain embodiments, viewport processing process 262 may be executed on processor 240 of mobile device 210. When so embodied, AV distribution process 264 may provide AV data from AV processing process 255 directly to viewport processing process 262 executing on processor 240, where it performs operations similar to those described above.

One or both of storage units 245 and 274 may include memory circuits that may include ROM, RAM, magnetic disk storage media devices, optical storage media devices, flash memory devices, electrical, optical, or other physical/tangible memory storage devices. Either or both of processors 240 and 270 are, for example, a microprocessor or microcontroller that executes instructions for any portion of the MCDA logic. Thus, in general, the memory of storage unit 245 may comprise one or more tangible (non-transitory) computer readable storage media (e.g., a memory device) encoded with software comprising computer executable instructions that, when executed by the processor 240, is operable to perform the operations described herein in connection with communications logic 225, view selection logic 230 and motion detection logic 235. Similarly, the memory of storage unit 274 may comprise one or more tangible (non-transitory) computer readable storage media encoded with software comprising computer executable instructions that, when executed by processor 270, is operable to perform the operations described herein in connection with communications logic 256, view selection logic 254, AV collection logic 258, AV processing logic 260, viewport processing logic 262 and AV distribution logic 264. In certain embodiments, such as when the viewport processing logic 262 is performed onboard mobile device 210, the corresponding tangible (non-transitory) computer readable storage media will include suitable computer executable instructions therefor.

Figure 6:
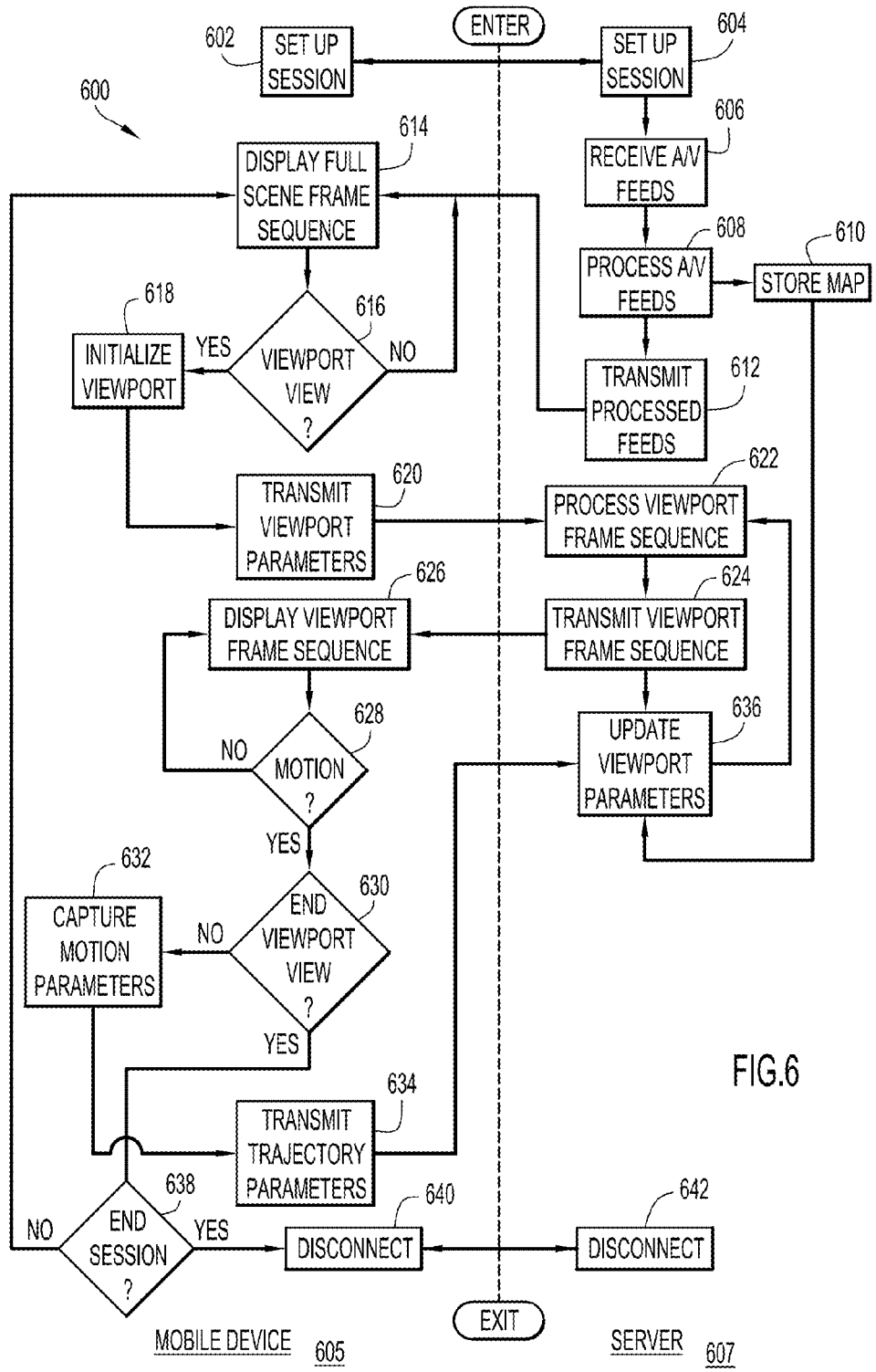
FIG. 6 is a flow chart illustrating an example motion capture data access process.

In FIG. 6, an example of a flow chart of an MCDA process 600 is illustrated. It is to be understood that while example process 600 is illustrated as being ordered in a sequence of operations, such order is not necessary. Indeed, operations may be performed in one or more alternative orders, certain operations may be combined into a single operation and operations illustrated in a single processing block may be achieved through multiple operations. Additionally, whereas operations are illustrated as being performed on one of mobile device processor 605 or server processor 607, alternative configurations are possible. For example, as noted above, viewport processing may be performed on mobile device 605 as opposed to being performed on server 607.

In operations 602, 604, a communication session is initiated between a mobile device processor 605 and a server processor 607. During the session setup, device capabilities and initialization data may be passed between mobile device 605 and server 607. Such data may include mobile device display size and resolution, degrees of detectable motion of sensors on mobile device 605, default origin in a virtual space of a user and default viewport view in the virtual space. Other pertinent data may be passed between mobile device 605 and server 607 as well. In operation 606, server 607 may receive AV streams from AV feed equipment, such as cameras, microphones, etc. The feed data may then be processed in operation 608, such as by the example processes described with reference to FIG. 4. In operation 610, the map of the virtual space may be stored so that a trajectory of motion of mobile device 605 can be mapped into a trajectory in the virtual space. The processed AV data are transmitted to mobile device 605 in operation 612.

On the mobile device 605, a full dynamic scene of one or more conference locations may be displayed in operation 614. In operation 616, it is determined whether a user has selected a viewport view and, if so, a viewport is initialized in operation 618. Such initialization may include establishing an initial location of the user in the virtual space as well as the orientation of the viewport in the virtual space. The viewport parameters, e.g., location and orientation of the viewport, are transmitted to server 607 in operation 620.

In operation 622, the viewport parameters are used to project the viewport into the virtual space and AV frames are generated from the dynamic scene mapped thereby in accordance with the projection. The viewport frames are transmitted to mobile device 605 in operation 624. The viewport frames are displayed in operation 626. In operation 628, it is determined whether motion of mobile device 628 is detected and, if so, it may be determined in operation 630 whether the viewport view is terminated by a user command, such as by the user controls described with reference to FIG. 3. If not, the motion parameters are captured in operation 632 and used to form a spatial trajectory. Corresponding trajectory parameters are transmitted to server 607 and are there used to update the viewport parameters in operation 636. In updating the viewport parameters, server processor 607 may retrieve the stored virtual space map to map the spatial trajectory into a trajectory in the virtual space. The updated viewport parameters may be provided to operation 622, whereby an updated viewport AV frame sequence is generated.

In operation 638, it is determined whether the communication session is to be terminated and, if so, the session is terminated and the communication channel may be closed in operations 640 and 642.

In summary, a system and method are provided to enhance the viewing experience for a mobile conference user by using natural movements to capture user viewing preference (remote control pan/zoom). When a user moves his device around or changes positions, the view changes in such a way that it creates an illusion of being a lens/window into another room.

The above description is intended by way of example only.

What is claimed is:

1. A method comprising:
   generating audio-visual (AV) frames;
   establishing a viewport to span a portion of each of the AV frames;
   detecting motion of a user device along a spatial trajectory;
   mapping AV data in the AV frames to a virtual space;
   determining a trajectory in the virtual space from the spatial trajectory;
   determining an offset of the viewport for each frame of consecutive AV frames according to the trajectory in the virtual space;
   updating the portion spanned by the viewport in the consecutive AV frames so as to correspond with the spatial trajectory; and
   displaying the updated viewport of the consecutive AV frames on the user device.

2. The method of claim 1, wherein generating the AV frames includes:
   receiving a plurality of AV streams of source AV frames;
   ordering the source AV frames of each of the AV streams in a spatial order; and
   combining the source AV frames into the AV frames in accordance with the spatial order.

3. The method of claim 2, wherein generating the AV frames includes:
   determining an absence of dynamic data in any of the AV streams; and
   excluding the AV frames of the AV streams absent the dynamic data from the combining.

4. The method of claim 1, wherein the user device is a handheld mobile communication device, wherein determining the trajectory in the virtual space includes forming the spatial trajectory in accordance with any body movement of a user holding the communication device.

5. The method of claim 4, wherein determining the trajectory in the virtual space includes:
   detecting rotation of the user device about one of orthogonal axes; and
   mapping the rotation of the user device into a rotation of the viewport in the virtual space.

6. The method of claim 4, further comprising:
   dimensioning the viewport to correspond to boundaries of a display of the communication device.

7. The method of claim 1, wherein generating comprises generating AV frames that are part of a video conference, and wherein detecting comprises detecting motion of the user device that is an endpoint of a participant in a video conference and the AV frames are video frames that contain one or more other participants in the video conference.

8. An apparatus comprising:
   a network interface device configured to enable communications over a network; and
   a processor coupled to the network interface device and configured to:
   generate audio-visual (AV) frames;
   establish a viewport to span a portion of each of the AV frames;
   receive signals representing motion detected of a user device along a spatial trajectory;
   map AV data in the AV frames to a virtual space;
   determine a trajectory in the virtual space from the spatial trajectory;
   determine an offset of the viewport for each frame of consecutive AV frames according to the trajectory in the virtual space;
   update the portion spanned by the viewport in the consecutive AV frames so as to correspond with the spatial trajectory; and
   generate display data for the updated viewport of the consecutive AV frames.

9. The apparatus of claim 8, wherein the processor is configured to:
   receive a plurality of AV streams of source AV frames;
   order the source AV frames of each of the AV streams in a spatial order; and
   combine the source AV frames into the AV frames in accordance with the spatial order.

10. The apparatus of claim 9, wherein the processor is configured to:
    determine an absence of dynamic data in any of the AV streams; and
    exclude the AV frames of the AV streams absent the dynamic data from the combined source AV frames.

11. A system comprising the apparatus of claim 8, further comprising:
    motion sensors configured to produce a signal responsive to movement of the user device along the spatial trajectory in accordance with any body movement of a user holding the user device.

12. The system of claim 11, wherein the motion sensors are configured to generate the signal responsive to rotation of the user device about one of two orthogonal axes, and the user device further configured to map the rotation of an enclosure into a rotation of the viewport in the virtual space.

13. The system of claim 11, further comprising:
    a display associated with the user device, the viewport being dimensioned to correspond to boundaries of the display.

14. The apparatus of claim 10, further comprising:
    a plurality of cameras distributed about a space to generate the AV streams, the AV data being spatially ordered in the virtual space in accordance with the spatial distribution of the cameras.

15. The apparatus of claim 14, wherein the processor is configured to communicate in accordance with a teleconferencing protocol.

16. A tangible computer readable medium having instructions encoded thereon that, when executed by a processor, are operable to:
    generate audio-visual (AV) frames;
    establish a viewport to span a portion of each of the AV frames;
    receive signals representing motion detected of a user device along a spatial trajectory;
    map AV data in the AV frames to a virtual space;
    determine a trajectory in the virtual space from the spatial trajectory;

determine an offset of the viewport for each frame of consecutive AV frames according to the trajectory in the virtual space;

update the portion spanned by the viewport in the consecutive AV frames so as to correspond with the spatial trajectory; and generate display data for the updated viewport of the consecutive AV frames on the user device.

17. The tangible computer readable medium of claim 16, further comprising instructions encoded thereon that, when executed by the processor, are operable to:

map AV data in the AV frames to a virtual space;

determine a trajectory in the virtual space from the spatial trajectory; and determine an offset of the viewport for each of the consecutive AV frames according to the trajectory in the virtual space.

18. The tangible computer readable medium of claim 16, further comprising instructions encoded thereon that, when executed by the processor, are operable to:

receive a plurality of AV streams of source AV frames;

order the source AV frames of each of the AV streams in a spatial order; and combine the source AV frames into the AV frames in accordance with the spatial order.

19. The tangible computer readable medium of claim 16, further comprising instructions encoded thereon that, when executed by the processor, are operable to:

determine an absence of dynamic data in any of the AV streams; and exclude the AV frames of the AV streams absent the dynamic data from the combined source AV frames.

20. The tangible computer readable medium of claim 16, further comprising instructions encoded thereon that, when executed by the processor, are operable to generate the signal responsive to rotation of the user device about one of two orthogonal axes, and the user device further configured to map the rotation of an enclosure into a rotation of the viewport in the virtual space.

* * * * *